(12) United States Patent
Harter

(10) Patent No.: US 11,904,680 B2
(45) Date of Patent: Feb. 20, 2024

(54) FRONT-END SECTION FOR MOTOR VEHICLE

(71) Applicant: Dr. Ing. h.c. F. Porsche Aktiengesellschaft, Stuttgart (DE)

(72) Inventor: Sebastian Harter, Weissach (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 17/714,203

(22) Filed: Apr. 6, 2022

(65) Prior Publication Data

US 2022/0371431 A1    Nov. 24, 2022

(30) Foreign Application Priority Data

May 21, 2021    (DE) ..................... 10 2021 113 243.6

(51) Int. Cl.
*B60K 11/08*    (2006.01)

(52) U.S. Cl.
CPC .................. *B60K 11/085* (2013.01)

(58) Field of Classification Search
CPC ........... F24F 13/15; F24F 13/08; B60K 11/04; B60K 11/085; Y02T 10/88
See application file for complete search history.

(56) References Cited

U.S. PATENT DOCUMENTS

| | | | | |
|---|---|---|---|---|
| 2,255,616 A * | 9/1941 | Heasley | .................. | F24F 13/08 49/81.1 |
| 2,276,279 A * | 3/1942 | Asklund | .............. | B60K 11/085 236/35 |
| 4,957,036 A * | 9/1990 | Fujihara | ............... | B60H 1/3428 454/155 |
| 5,476,138 A * | 12/1995 | Iwasaki | ................. | F28D 1/0435 165/41 |
| 7,354,340 B2 * | 4/2008 | Mochizuki | .............. | F24F 13/15 454/152 |
| 8,794,363 B2 * | 8/2014 | Wolf | .................... | B60K 11/085 180/68.1 |
| 8,892,314 B2 * | 11/2014 | Charnesky | ................ | F01P 7/04 180/68.1 |
| 10,071,625 B1 * | 9/2018 | Stoddard | .............. | B60K 11/085 |
| 10,647,194 B1 * | 5/2020 | Burtch | ................. | B60K 11/085 |
| 2012/0068498 A1 * | 3/2012 | Wolf | ........................ | B60T 5/00 296/193.1 |

(Continued)

FOREIGN PATENT DOCUMENTS

DE    102011115493 A1    4/2012
DE    102018109985 A1    10/2018

*Primary Examiner* — Kurt Philip Liethen
(74) *Attorney, Agent, or Firm* — RatnerPrestia

(57) ABSTRACT

A front-end section for a motor vehicle, having at least one air inlet opening for supplying a cooling air volume flow to a cooling module arranged behind the air inlet opening. In the air inlet opening, there is arranged in each case one slat device with multiple adjustable slats which are arranged adjacent to one another and which are each pivotable about a pivot axis between a closed slat position and an open slat position. The slats each have, at their end facing toward the cooling module, an air-guiding element which is configured such that, in an at least partially open slat position, the cooling air volume flow is diverted in the direction of the cooling module by the air-guiding element.

14 Claims, 2 Drawing Sheets

(56) References Cited

U.S. PATENT DOCUMENTS

| | | | |
|---|---|---|---|
| 2012/0074729 A1* | 3/2012 | Fenchak | B60K 11/085 296/193.1 |
| 2012/0090906 A1 | 4/2012 | Charnesky et al. | |
| 2015/0274002 A1* | 10/2015 | Vacca | B60H 1/00678 264/572 |
| 2021/0323397 A1* | 10/2021 | Iorga | B60R 19/52 |

* cited by examiner

FRONT-END SECTION FOR MOTOR VEHICLE

CROSS-REFERENCE TO RELATED APPLICATION

This application claims priority to German Patent Application No. 10 2021 113 243.6, filed May 21, 2021, the content of such application being incorporated by reference herein in its entirety.

FIELD OF THE INVENTION

The invention relates to a front-end section for a motor vehicle. The invention furthermore relates to a motor vehicle having such a front-end section.

BACKGROUND OF THE INVENTION

DE 10 2011 115 493 A1, which is incorporated by reference, discloses a motor vehicle having a front-end section in which there is provided an air inlet opening in which a slat device with adjustable slats is arranged. When the slats are closed, an air flow to a cooler arranged behind the air inlet opening is prevented, and when the slats are open, an air flow is permitted. The cooler is oriented vertically and in the vehicle longitudinal direction in the motor vehicle, and is impinged on by flow orthogonally when the slats are open. No influencing of the air flow occurs at the slats.

SUMMARY OF THE INVENTION

The front-end section for a motor vehicle has at least one air inlet opening for supplying a cooling air volume flow to a cooling module arranged behind the air inlet opening. In the air inlet opening, there is arranged in each case one slat device with multiple adjustable slats which are arranged adjacent to one another and which are each pivotable about a pivot axis between a closed slat position and an open slat position. The slats each have, at their end facing toward the cooling module (that end which faces toward the cooling module in an at least partially open slat position), an air-guiding element which is configured such that, in an at least partially open slat position, the cooling air volume flow is diverted (smoothly) in the direction of the cooling module by the air-guiding element.

By means of the air-guiding elements arranged in each case on that end of the slats which faces toward the cooling module, the flow direction can be changed smoothly in the direction of the cooling module. An abrupt diversion of the cooling air volume flow is thus avoided. The flow resistance is reduced by the smooth diversion. This has a positive effect on the air resistance ($c_w$ value) and on the cooling module volume flow.

The pivot axes of the slats are in particular oriented parallel to one another. Alternatively or in addition, the slats of the slat device are each mounted pivotably about their own pivot axes on the slat device, for example on a frame that encloses the slats, or in the air inlet opening, that is to say on the front-end section itself. Slats (cooling-air flaps) can then be used in order to realize the respectively best possible air resistance ($c_w$ value) in a manner dependent on the cooling demand.

The cooling module may be a (sole) cooler or one cooling module of a cooler or vehicle cooler that is formed from multiple cooling modules. The cooling module may in particular be configured as an air-water heat exchanger and have a fan. Irrespective of this, the front-end section may have a bumper and vehicle components mounted on or behind this, such as coolers, cooling lines, lighting devices, fastening elements for the coupling of the front-end section to the vehicle frame, and/or sensor arrangements. The front-end section may for example be a preassembled front end for a motor vehicle.

When the cooling air slats are closed, or in a closed slat position (slats pivoted into a closed position), the cross section of the air inlet opening is at least substantially, preferably completely, closed, such that no or only a minimal cooling air volume flow reaches the cooling module (free flow cross section is at a minimum). The best possible air resistance ($c_w$ value) can thus be achieved.

When the cooling air flaps are open, or in a fully open slat position (slats pivoted all the way into the open position), the air inlet opening is substantially opened up, such that a correspondingly large cooling air volume flow reaches the cooling module (free flow cross section is at a maximum). The best possible air cooling air demand can thus be achieved.

Intermediate positions (partially open slat positions) between the closed and the fully open slat positions are possible. The intermediate additions each constitute a compromise between the best possible air resistance and the best possible cooling air demand.

The cooling module or the air inlet surface of the cooling module may enclose an angle $\beta$, in particular an angle of 20° to 40°, preferably of 25° to 35°, more preferably an angle of 30°, with the front-end section transverse axis for the vehicle transverse axis (y axis). This promotes aerodynamically advantageous shaping ("arrowing") of the front-end section.

The pivot axes of the slats may preferably each be oriented along or parallel to the front-end section vertical axis or vehicle vertical axis (z axis). In an at least partially open slat position, this promotes an impingement of flow on the cooling module, in particular if the cooling module is arranged eccentrically in relation to the front-end section.

The slats may preferably each have a slat vane, wherein, in each case, the air-guiding element encloses an inclination angle $\alpha$ with the slat vane. In other words, the central longitudinal plane of the slat vane and the central longitudinal plane of the air-guiding element enclose an inclination angle $\alpha$ with one another. In this way, a diversion of the cooling air volume flow can be achieved. The slat vane is situated in each case in particular at that end of the slat which is averted from the cooling module in an at least partially open slat position. The slat vane and the air-guiding element may adjoin one another and/or transition into one another, in particular in a materially integral manner. A rib for increasing the torsional stiffness of the slat may optionally be arranged between the slat vane and air-guiding element.

The slats may preferably be arranged adjacent to one another with respect to the front-end section transverse axis or the vehicle transverse axis, wherein the inclination angle $\alpha$ on the slats decreases outwardly (that is to say toward the respective side of the front-end section) along the front-end section transverse axis or the vehicle transverse axis (y axis). Thus, the slats arranged closer to the centre of the front-end section have a greater inclination angle $\alpha$ than slats arranged further remote from the center of the front-end section. This promotes the impingement of flow on the cooling module, which contributes to a low flow resistance ($c_w$ value) and to a sufficient cooling module volume flow.

The inclination angle α on the slats may preferably be between 1° (at the very outside, that is to say on the slat arranged furthest remote from the centre of the front-end section) and 60° (at the very inside, that is to say on the slat arranged closest to the centre of the front-end section) (1°<inclination angle α<)60° . This allows a sufficient adaptation of the cooling module volume flow that impinges on the cooling module. The inclination angles of the air-guiding elements may for example be ascertained iteratively for each slat individually by numerical fluid mechanics (competition of fluid dynamics).

The air-guiding element may preferably be configured so as to divert the cooling air volume flow over the entire height h of the slat or of the slat vane. A relatively extensive and effective diversion of the cooling module volume flow can thus be achieved.

The slats may preferably each have two axle arms by means of which the slats are in each case pivotably mounted, wherein the air-guiding element is arranged between the two axle is arms and connects the two axle arms to one another. This contributes to a stable and relatively torsion-resistant design of the slats. In this way, the slats or slat vanes can be a relatively thin design, which increases the free flow cross section at the air inlet opening in particular in an at least partially open slat position. Owing to the arrangement of the air-guiding element between the two axle arms, the air-guiding element can be connected to the axle arms such that the cross section and flow resistance is minimized.

In each case one pivot element and/or one actuating element may project from the axle arms. The pivot element may for example be configured as a journal, wherein the two pivot elements of one slat defined the pivot axis thereof. The actuating element may for example be of journal-like form and serve for the coupling of an actuator or an actuating lever. The actuating element may be formed on or in a lever section that projects from the axle arm.

The front-end section may preferably have multiple air inlet openings in which in each case one slat device is arranged. The slat device may have in each case one or more of the above-described aspects. The air inlet openings with the slat devices arranged therein may be arranged symmetrically with respect to the centre of the front-end section, for example at a first end and at an opposite second end of the front-end section in a front-end section transverse direction or vehicle transverse direction (y axis).

The motor vehicle may be a passenger motor vehicle that is powered by internal combustion engine, partially electrically or fully electrically, in particular a sports car, a sedan or an SUV.

The measures described above and/or the measures yet to be discussed below may be used for the further configuration of the motor vehicle.

BRIEF DESCRIPTION OF THE DRAWING FIGURES

Further advantageous configurations will emerge from the following description and the drawing. In the drawing, in each case schematically:

DETAILED DESCRIPTION OF THE INVENTION

Figure 1:
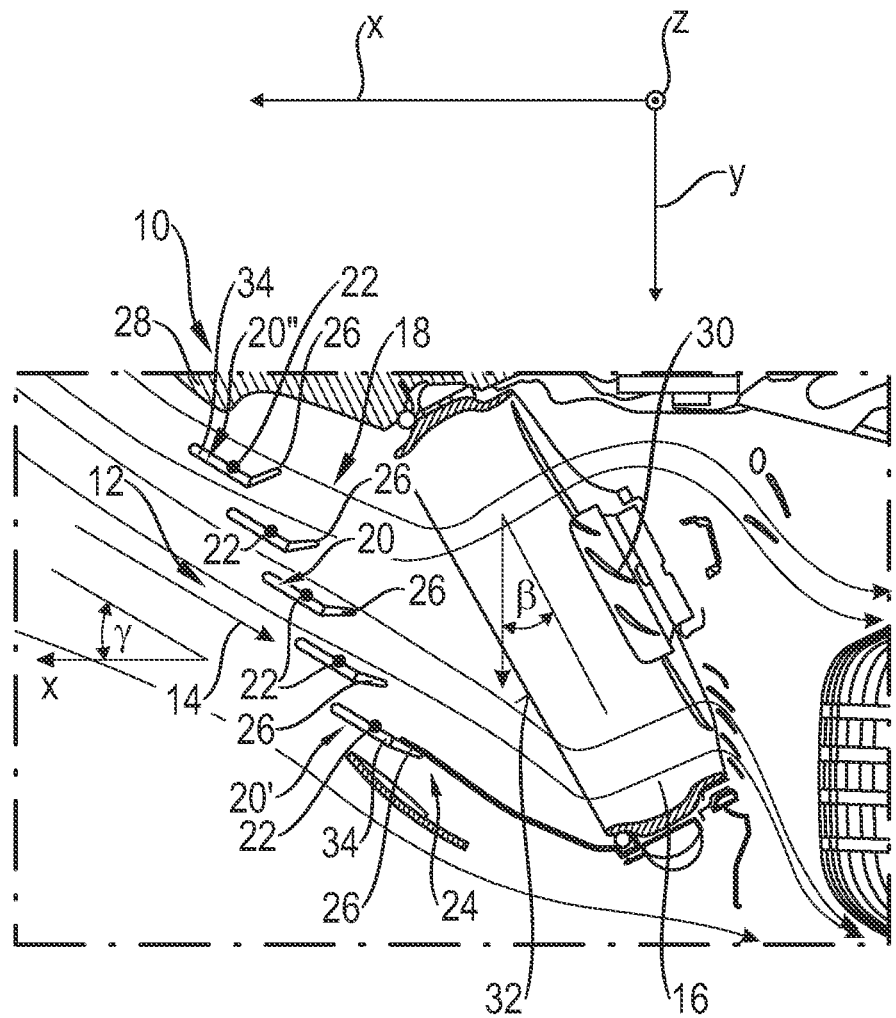
FIG. 1 shows a sectional view through a part of a front-end section with an air inlet opening and with a slat device with multiple slats.

FIG. 1 schematically shows a sectional view through a part of a front-end section 10 for a motor vehicle (not illustrated in any more detail).

The front-end section 10 has at least one air inlet opening 12 for supplying a cooling air volume flow 14 to a cooling module 16 arranged behind the air inlet opening 12. In the air inlet opening 12, there is arranged in each case one slat device 18 with multiple adjustable slats 20 which are arranged adjacent to one another and which are each pivotable about a pivot axis 22 between a closed slat position (not shown) and an open slat position (cf. FIG. 1).

Figure 2:
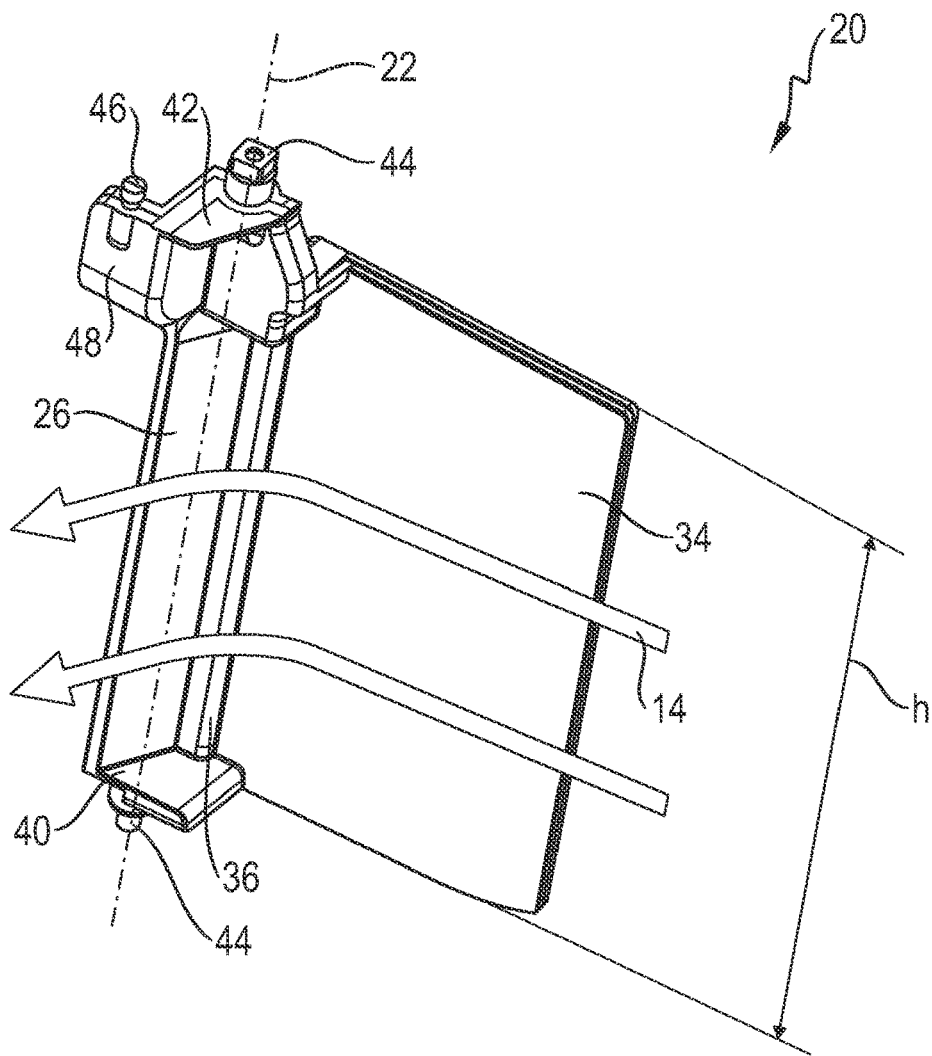
FIG. 2 shows a perspective view of a slat of the slat device.

The slats 20 each have, at their end 24 facing toward the cooling module 16, an air-guiding element 26 which is configured such that, in an at least partially open slat position, the cooling air volume flow 14 is diverted smoothly in the direction of the cooling module 16 by the air-guiding element 26 (cf. FIG. 1 and FIG. 2).

The pivot axes 22 of the slats 20 are oriented parallel to one another in the example. The slats 20 are each mounted, so as to be pivotable about their pivot axis 22, on the slat device 18 or on the front-end section 10 itself, as discussed above. In the example, the front-end section 10 has a bumper 28 and vehicle components mounted on or behind the bumper 28, as discussed above. In the example, the cooling module 16 is configured as an air-water heat exchanger and has a fan 30.

The cooling module 16 or the air inlet surface 32 of the cooling module 16 encloses an angle β with the front-end section transverse axis or the vehicle transverse axis (y axis). In the example, the angle β=30°. The pivot axes 22 of the slats 20 are each oriented along or parallel to the front-end section vertical axis or vehicle vertical axis (z axis) (in FIG. 1, the z axis projects perpendicularly out of the plane of the drawing). The front-end section longitudinal axis or vehicle longitudinal axis is oriented along or parallel to the x axis. The flow direction of the cooling air volume flow 14 encloses an angle γ with the front-end section longitudinal axis or vehicle longitudinal axis (x axis). In the example, the angle γ=30°.

Figure 3:
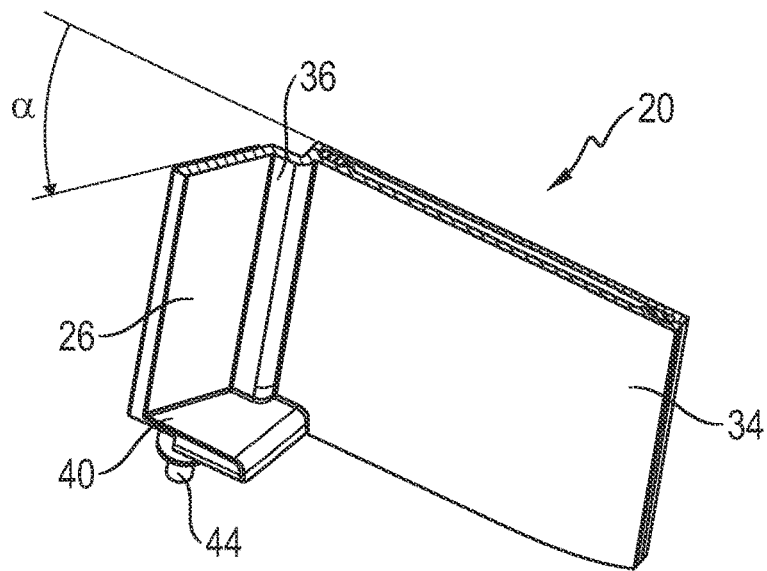
FIG. 3 shows a perspective partial view of the slat from FIG. 2.

The slats 20 each have a slat vane 34, wherein the air-guiding element 26 encloses in each case an inclination angle α with the slat vane 34 (cf. FIGS. 2 and 3). In other words, the central longitudinal plane of the slat vane 34 and the central longitudinal plane of the air-guiding element 26 enclose the inclination angle α with one another. In the example, the slat vane 34 is situated in each case at that end of the slat 20 which is averted from the cooling module 16 in an at least partially open slat position (cf. FIG. 1).

In the example, the slat vane 34 and the air-guiding element 26 adjoin one another and transition into one another in a materially integral manner (cf. FIGS. 2 and 3). In the example, a rib 36 for increasing the torsional stiffness of the slat 20 is arranged between the slat vane 34 and air-guiding element 26.

The slats 20 are arranged adjacent to one another with respect to the front-end section transverse axis or the vehicle transverse axis (y axis), wherein the inclination angle α on the slats 20 decreases outwardly (that is to say toward the side or sides of the front-end section 10) along the front-end section transverse axis or the vehicle transverse axis (y axis). Thus, the slats 20 arranged closer to the centre of the front-end section have a greater inclination angle α than slats arranged further remote from the center of the front-end section (cf. FIG. 1). The inclination angle α on the slats may be between 1° (at the very outside, that is to say on the slat 20' arranged furthest remote from the centre of the front-end section) and 60° (at the very inside, that is to say on the slat 20" arranged closest to the centre of the front-end section).

The air-guiding element 26 is configured so as to divert the cooling air volume flow over the entire height h of the slat 20 or of the slat vane 34 (cf. FIG. 2). The slats 20 each have two axle arms 40, 42 by means of which the slats 20 are in each case pivotably mounted, wherein the air-guiding element 26 is arranged between the two axle arms 40, 42 and connects the two axle arms 40, 42 to one another.

In the example, in each case one pivot element 44 projects from the axle arms 40, 42. The pivot element 44 may for example be configured as a journal, wherein the two pivot elements 44 of one slat 20 define the pivot axis 22 thereof.

In the example, an actuating element 46 projects from the axle arm 42. The actuating element 46 may for example be of journal-like form and serve for the coupling of an actuator or an actuating lever. The actuating element 46 may be formed on or in a lever section 48 that projects from the axle arm 42.

An example, the front-end section 10 has multiple air inlet openings 12 in which in each case one slat device 18 is arranged (only one air inlet opening is shown). The slat device 18 of the further air inlet opening is configured analogously to the slat device 18 described above. The air inlet openings 12 with the slat devices 18 arranged therein may be arranged symmetrically with respect to the centre of the front-end section, for example at a first end and at an opposite second end of the front-end section 10 in a front-end section transverse direction or vehicle transverse direction (y axis).

What is claimed:

1. A front-end section for a motor vehicle, said front-end section comprising:
   at least one air inlet opening for supplying a cooling air volume flow to a cooling module arranged behind the air inlet opening, and
   one slat device arranged in each air inlet opening, each slat device having multiple adjustable slats which are arranged adjacent to one another and which are each pivotable about a pivot axis between a closed slat position and an open slat position,
   wherein each slat has a slat body including both a slat vane and an air-guiding element, wherein the air-guiding element is disposed at an end of the slat body facing toward the cooling module, wherein the air-guiding element extends in a downstream direction relative to the slat vane as viewed in a direction of air flow travel through the air inlet opening, the air-guiding element being configured such that, in an at least partially open slat position, the cooling air volume flow is diverted in a direction of the cooling module by the air-guiding element,
   wherein each pivot axis is oriented along or parallel to a front-end section vertical axis (z), wherein the pivot axes are disposed on a vertical plane that encloses an angle (β) of 20° to 40° with a front-end section transverse axis (y), and wherein the cooling module also encloses an angle (β) of 20° to 40° with the front-end section transverse axis (y).

2. The front-end section has claimed in claim 1, wherein the air-guiding element encloses an inclination angle (α) with the slat vane.

3. The front-end section as claimed in claim 2, wherein the slats are arranged adjacent to one another with respect to the front-end section transverse axis (y), wherein the inclination angle (α) on the slats decreases outwardly along the front-end section transverse axis (y).

4. The front-end section as claimed in claim 2, wherein the inclination angle (α) on the slats amounts to between 1° and 60°.

5. The front-end section as claimed in claim 1, wherein the air-guiding element is configured to divert the cooling air volume flow over an entire height (h) of the slat.

6. The front-end section as claimed in claim 1, wherein the slats each have two axle arms by means of which the slats are in each case pivotably mounted, wherein the air-guiding element is arranged between the two axle arms and connects the two axle arms to one another.

7. The front-end section according to claim 1, wherein the front-end section has multiple air inlet openings, in which in each case one slat device is arranged.

8. The front-end section according to claim 1, wherein the angle (β) is 30°.

9. A motor vehicle having the front-end section as claimed in claim 1.

10. The front-end section according to claim 1, wherein the slat vane comprises a planar surface of the slat body, and the air-guiding element comprises a planar surface of the slat body, and wherein an inclination angle is defined between the planar surfaces.

11. The front-end section according to claim 10, wherein the inclination angle of a first slat of the multiple adjustable slats is less than the inclination angle of a second slat of the multiple adjustable slats, the second slat being positioned further along the front-end section transverse axis (y) than the first slat.

12. The front-end section according to claim 1, wherein, for each slat body, the slat vane is formed integrally with the air-guiding element.

13. The front-end section according to claim 1, wherein the slat vane comprises a planar surface of the slat body, and the air-guiding element comprises a planar surface of the slat body, and wherein an inclination angle is defined between the planar surfaces.

14. The front-end section as claimed in claim 13, wherein the inclination angle (α) on the slats amounts to between 1° and 60°.

* * * * *